United States Patent [19]

Long et al.

[11] 4,253,568
[45] Mar. 3, 1981

[54] VIDEO CASSETTE CONTAINER

[75] Inventors: Jerry M. Long, Ben Lomond; James A. Womack, Livermore, both of Calif.

[73] Assignee: Innovative Concepts, Inc., Los Gatos, Calif.

[21] Appl. No.: 44,372

[22] Filed: Jun. 1, 1979

[51] Int. Cl.³ ................. B65D 85/672; B65D 43/14
[52] U.S. Cl. ........................... 206/387; 220/335; 220/340
[58] Field of Search ............ 220/335, 338, 340; 206/387

[56] References Cited

U.S. PATENT DOCUMENTS

| 3,392,820 | 7/1968 | Azim | 220/335 X |
| 3,909,088 | 9/1975 | Dennehey et al. | 206/387 |
| 4,148,411 | 4/1979 | Hodge et al. | 220/335 |

FOREIGN PATENT DOCUMENTS 2538044  3/1977  Fed. Rep. of Germany .......... 206/387

*Primary Examiner*—Joseph M. Moy
*Attorney, Agent, or Firm*—Claude A. S. Hamrick

[57] ABSTRACT

An improved cassette container including a rectangular body which is open on a front side and is closed on the five other sides. The left and right side walls extend outwardly on either side of the opening to accommodate attachment of a generally rectangular closure which is open on the back side and bottom side and closed on the remaining four sides. Mating sliding hinge means are provided at the bottom of the closure and on the lower portion of the side wall extensions, and detent locking means are provided on the inside upper side walls of the closure and on the upper portions of the container side wall extensions.

7 Claims, 10 Drawing Figures

VIDEO CASSETTE CONTAINER

BACKGROUND OF THE INVENTION

1. Field of the Invention

The present invention relates to recording cassette containers and more particularly to a cassette container particularly suited for housing video tape cassettes.

2. Description of the Prior Art

As noncommercial video tape recording apparatus has become increasingly more popular and has found its way into many homes and offices around the world, a need has been created for providing means for storing the video tape cassettes in a convenient and readily accessible manner.

Although there are numerous types of containers on the market (see, for example, U.S. Pat. Nos. 3,876,071, and 4,011,940, as well as my copending applications, Ser. No. 947,421, filed Oct. 2, 1978; 1,227, filed Jan. 5, 1979; and 1,377, filed Jan. 5, 1979), with the exception of that shown in my previously mentioned application, Ser. No. 947,421, such prior art containers have not been suitable for top of the unit or shelf display.

Other problems with prior art containers have been the cost of manufacture and the reliability of the container; particularly the reliability of the hinge mechanism of the container. It has been found that in molded plastic containers having integrally formed hinge pins at a corner of a closure and which mate with holes or dimples in the container front edge, such as it shown in my last-mentioned application and in U.S. Pat. No. 3,909,088, if the container is dropped, the hinge pins may be sheared off. This, of course, makes the container unusable in the manner intended.

SUMMARY OF THE PRESENT INVENTION

It is therefore an object of the present invention to provide a novel cassette container particularly suited for video tape applications and having a hinge mechanism which is strong and durable and resistant to damage should the cassette be inadvertently dropped or otherwise mishandled.

Briefly, a preferred embodiment of the present invention includes a rectangular body which is open on a front side and is closed on the five other sides. The left and right side walls extent outwardly on either side of the opening to accommodate attachment of a generally rectangular closure which is open on the back side and bottom side and closed on the remaining four sides. Mating sliding hinge means are provided at the bottom of the closure and on the lower portion of the side wall extensions, and detent locking means are provided on the inside upper side walls of the closure and on the upper portions of the container side wall extensions.

Among the advantages of the present invention is that it provides a device having a hinging configuration which is rugged yet simple, is easily moldable and is not readily subject to damage in normal use.

These and other objects of the present invention will no doubt become apparent to those of ordinary skill in the art after having read the following detailed description of the preferred embodiment which is shown in the several figures of the drawing.

IN THE DRAWING

DETAILED DESCRIPTION OF THE PREFERRED EMBODIMENT

Figure 1:
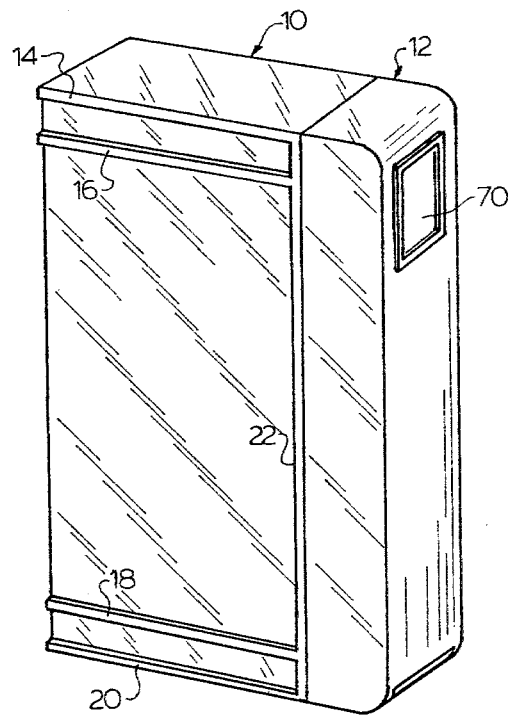
FIG. 1 is a perspective view showing a cassette container and closure in accordance with the present invention.

Referring now to FIG. 1 of the drawing, there is shown a perspective view of a video cassette container having a body portion 10 and a closure portion 12. As illustrated, the body portion is generally rectangular in configuration with smooth external side surfaces having horizontally extending ribs 14, 16, 18 and 20 provided at the top and bottom of the left and right sides. While serving as stiffening ribs for the side walls, the ribs 18 also provide guide edges for accommodating insertion of the container into a storage rack such as is disclosed in my copending application, Ser. No. 947,421. Note also that a vertical stiffening rib 22 is provided at the mating juncture with the closure 12.

Figure 2:
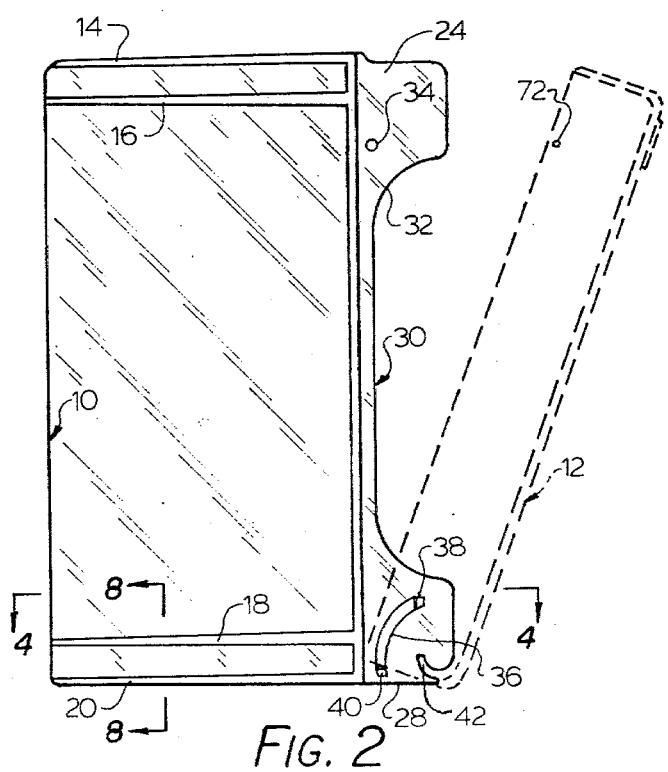
FIG. 2 is a side view showing the container body of the embodiment illustrated in FIG. 1 with the closure shown in phantom lines.
Figure 3:
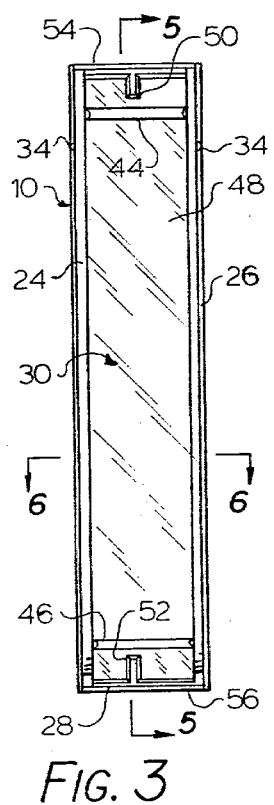
FIG. 3 is a front elevational view looking into the opening of the container body illustrated in FIG. 1.

As may be noted from FIGS. 2 and 3, the left and right side walls 24 and 26, respectively, and bottom wall 28 are all extended forwardly of the opening 30 in the front side of the container body. The left and right side wall extensions 24 and 26 are each notched as indicated at 32 to provide easy gripping access to the front portion of a cassette stored in the container body 10.

A small closure locking detect 34 is provided on the exterior upper surface of each of the side wall extensions 24 and 26, and a two-depth, quarter-circular, arcuate groove 36 is provided in the exterior lower surface of each side wall extension. The end portions 38 and 40 of groove 36 have slightly deeper depths than the remaining portion of the groove.

A curvilinear or arcuate slot 42 is also included in the lower portion of each side wall extension to provide portions of a sliding hinge means for the closure 12 as will be further explained below.

Referring to FIG. 3, it will be observed that the interior of the container body 10 is provided with spacer ribs 44 and 46 which extend horizontally along the upper and lower portions of the side walls 24 and 26, and the rear wall 48. Cassette guide rails 50 and 52 extend downwardly and upwardly, respectively, along the inside surfaces of the top wall 54 and the bottom wall 56. The guide rails in the illustrated configuration are to accommodate a Betamax cassette, but may alternatively be configured to accommodate a VHS cassette.

Figure 8:
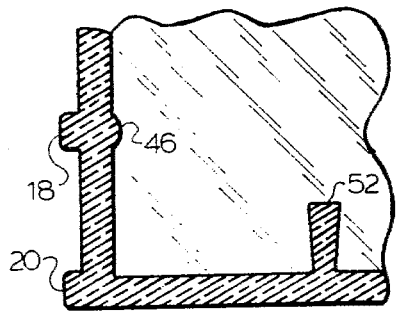
FIG. 8 is a partial cross sectional view taken along the lines 8—8 of FIG. 2.
Figure 4:
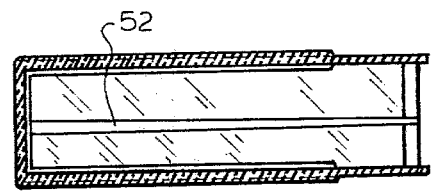
FIG. 4 is a cross sectional view taken along the lines 4—4 of FIG. 2.
Figure 5:
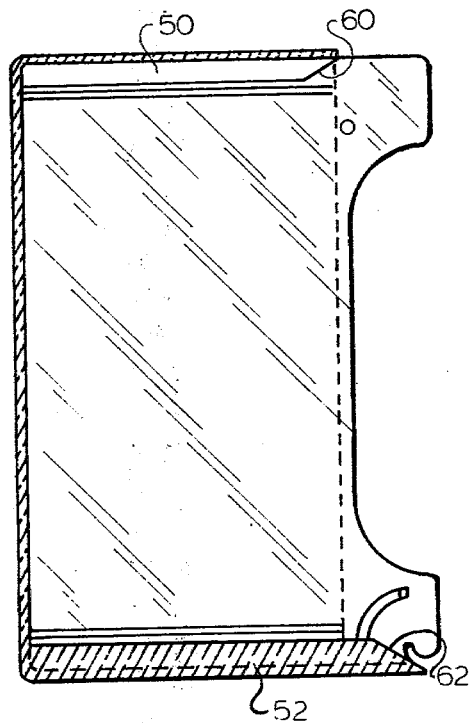
FIG. 5 is a cross sectional view taken along the lines 5—5 of FIG. 3.

As may be noted from FIG. 4 and FIG. 5 of the drawing, the front ends of the guide rails 50 and 52 are angled as illustrated at 60 and 62, and the rails are tapered from fore to rear so as to accommodate easy entry of the cassette. The actual configuration of the external ribs 18 and 20, the internal rib 46 and the lower guide rail 52 are more clearly shown in the enlarged partial cross-section of FIG. 8.

Figures 6, 7:
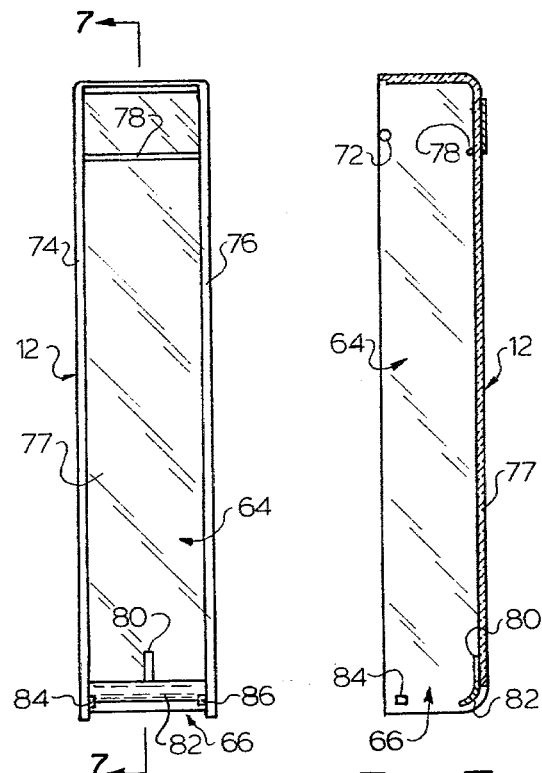
FIG. 6 is a rear elevational view looking into the rear side of the closure shown in FIG. 1.
FIG. 7 is a cross sectional view taken along the line 7—7 of FIG. 6.

In FIGS. 6 and 7 of the drawing, it will be noted that the closure 12 is open on its rear side 64 and bottom side 66, has a label-accommodating recess 70 provided in the exterior surface of its front wall, and detent-receiving dimples 72 are provided in the upper interior surfaces of the side walls 74 and 76. A horizontally extending spacer rib 78 is also provided in the upper interior surface of the front wall, and a short segment 80 of the vertically extending spacer is provided on the lower interior front wall surface.

Figure 9:
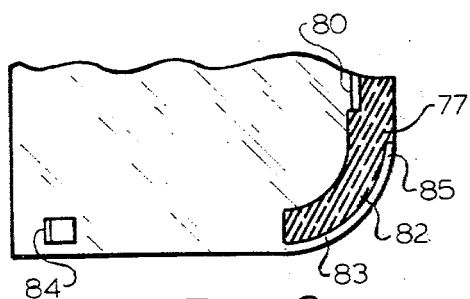
FIG. 9 is an enlarged partial sectional view showing the closure hinge mechanism illustrated in FIG. 7.

As is more clearly illustrated in the enlarged partial section illustrated in FIG. 9, the lower-most extremity 82 of front wall 77 is both curled inwardly and offset rearwardly relative to the main wall portion. Note also that opposite the rear-most extension of the curled wall portion 82, and extending inwardly from the interior surfaces of the side walls 74 and 76, are detents 84 and 86. These elements form the male components of the sliding hinge mechanism.

Figure 10:
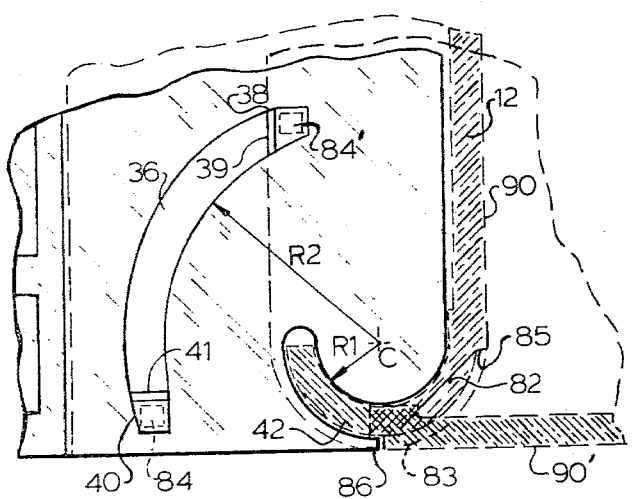
FIG. 10 is an enlarged partial sectional view showing the container hinge mechanism shown in FIG. 2.

In FIG. 10, the female components of the sliding hinge mechanism are illustrated. These elements include the arcuate slots 42 and the arcuate grooves 36. As indicated by the radially extending arrows R1 and R2, the slots 42 and grooves 36 share a common center point but have different radii.

As illustrated by the dashed lines 90, with the closure member 12 mated to the body 10 and in the closed position, the detent 84 engages the lower-most recess 40 of groove 36 and the curled edge 82 of the front wall extends slightly into the front side of the groove 42. In this position, the side wall portions 83 (FIG. 9) which extend below the curled extremity 82, protect the forward-most extremity 86 of the bottom and side wall extensions. With the closure in the position illustrated, although not specifically shown, it will be appreciated that the detents 34 on the upper wall extensions engage the dimples 72 in the interior wall surfaces of the closure thereby locking the closure in the closed position.

By applying forward pressure to the upper portion of closure 12, the dimples 72 can be dislodged from the detents 34 allowing the closure top to be rotated outwardly. As this occurs, the detents 84 cam upwardly over the groove transitions 41 leaving the deep recessed end portions 40 and slide along the more shallow groove portions 36. As this occurs, it causes the curled edge portion 82 of the front wall to slide into the slots 42, thereby permitting the closure to rotate 90° into the fully open position illustrated by the dashed lines 90'.

Note that when in the fully open position, the detents 84 are positioned within the deeply recessed portions 38 of groove 36, thereby locking the closure in that position. In order to return the closure to the closed position, rotating pressure is applied to the upper extremity of the closure, causing the detents 84 to cam upwardly over the transitional edge 39 and into the groove 36, and causing the curled edge 82 to slidably withdraw itself from the slots 42.

It will therefore be appreciated that although the illustrated hinge means is the full equivalent of a pair of mating pivot detent and dimple structures, it is substantially stronger and more able to endure shock and other forces applied thereto by mishandling than is any prior art configuration. This insures that the useful life of the container is substantially longer than that of prior art devices having detent and dimple pivot configuration.

Although a single preferred embodiment of the present invention has been illustrated, it will be appreciated that certain alterations and modifications thereof may become apparent to those of ordinary skill in the art. For example, the positions of the mating detents and grooves could be interchanged. It is, however, intended that the appended claims be interpreted as covering all such alterations and modifications as fall within the true spirit and scope of the invention.

What is claimed is:

1. Container apparatus for video tape cassettes and the like comprising:

a generally rectangular container body having left, right, top, bottom and rear side walls and a front opening, said left, right and bottom side walls having portions extending outwardly of said opening, said outwardly extending left and right wall portions having an arcuate slot extending from the front lowermost edge rearwardly and upwardly, and the exterior side surfaces of said outwardly-extending portions having an arcuate groove formed therein and extending from a point proximate the lower extremity thereof upwardly and forwardly, said arcuate slots and said arcuate grooves having common radical center points; and a generally rectangular closure member having front, left, right and top side walls and being open on the bottom and rear sides to receive said left, right and bottom side wall outwardly extending portions, the lower extremity of said front wall being curled downwardly and rearwardly and having a radius of curl of substantially the same length as the radius of said arcuate slot, and detent means provided on the interior surface of said closure side walls and positioned to matingly engage said arcuate grooves, whereby when said closure member is in a closed position relative to said body, said detent means engage the lower extremities of said arcuate grooves, and the terminal edge of said curled extremity extends part way into said arcuate slots, and when rotated into an open position, said detent means engage the upper extremities of said arcuate grooves, and said curled extremity extends fully into said arcuate slots.

2. Container apparatus for video tape cassettes and the like as recited in claim 1 wherein said forwardly-extending side wall portions of said body have additional detent means provided in an upper portion thereof and the interior upper wall portions of said closure side walls have dimple means provided therein for engagement with said additional detent means to lock said closure member in its closed positions.

3. Container apparatus for video tape cassettes and the like as recited in claim 2 wherein said body includes guide rails extending into said body and inwardly from the interior surfaces of said body top and bottom walls for engaging corresponding grooves in a video cassette to be stored therein.

4. Container apparatus for video tape cassettes and the like as recited in claims 1, 2 or 3 wherein said body further includes horizontally-extending exterior rib means for strengthening said body side walls and for providing a guide edge for mating with the guide rails of a storage tray.

5. Container apparatus for video tape cassettes and the like as recited in claims 1, 2 or 3 wherein the lower-most extremity of each said arcuate slot is spaced upwardly from the exterior surface of the outwardly-extending portion of said bottom wall, and wherein said curled edge portion is offset rearwardly and upwardly relative to the lower-most extremities of said closure side walls.

6. Container apparatus for video tape cassettes and the like as recited in claim 5 wherein the juncture of the external surface of said offset curled portion and the external surface of said closure front wall form a shoulder for stoppingly engaging the forward-most extending edge of said bottom wall extension.

7. Container apparatus for video tape cassettes and the like as recited in claim 6 wherein the interior walls of said body are provided with spacer ribs for spacing a contained video cassette away from the interior surfaces of said side walls.

* * * * *